(12) United States Patent
Ouboter

(10) Patent No.: US 9,365,256 B2
(45) Date of Patent: Jun. 14, 2016

(54) INFANT SCOOTER

(71) Applicant: MICRO MOBILITY SYSTEMS AG, Kuesnacht (CH)

(72) Inventor: Jan Willem Anton Ouboter, Uetikon am See (CH)

(73) Assignee: MICRO MOBILITY SYSTEMS AG, Kuesnacht (CH)

( * ) Notice: Subject to any disclaimer, the term of this patent is extended or adjusted under 35 U.S.C. 154(b) by 0 days.

(21) Appl. No.: 14/692,141

(22) Filed: Apr. 21, 2015

(65) Prior Publication Data

US 2015/0225034 A1    Aug. 13, 2015

Related U.S. Application Data

(63) Continuation of application No. 14/291,847, filed on May 30, 2014, now Pat. No. 9,022,406, which is a continuation of application No. 13/346,591, filed on Jan. 9, 2012, now Pat. No. 8,740,236.

(30) Foreign Application Priority Data

Jan. 17, 2011    (DE) ..................... 20 2011 001 596 U

(51) Int. Cl.
*B62K 9/02*    (2006.01)
*B62K 19/00*    (2006.01)
*B62K 3/00*    (2006.01)
*B62K 21/00*    (2006.01)

(52) U.S. Cl.
CPC ................. *B62K 19/00* (2013.01); *B62K 3/002* (2013.01); *B62K 9/02* (2013.01); *B62K 21/005* (2013.01)

(58) Field of Classification Search
CPC ......... B62K 21/005; B62K 3/002; B62K 9/02
USPC ............ 280/263, 200, 87.01, 87.021, 87.042, 280/87.041
See application file for complete search history.

(56) References Cited

U.S. PATENT DOCUMENTS

| 1,128,810 | A |  | 2/1915 | Martin |
|---|---|---|---|---|
| 1,535,167 | A |  | 4/1925 | Lovell |
| 1,838,877 | A |  | 12/1931 | Stevens |
| 4,054,297 | A | * | 10/1977 | Solimine .................. 280/87.042 |
| 4,941,670 | A |  | 7/1990 | Parr |
| 5,924,710 | A | * | 7/1999 | de Courcey Milne ... 280/87.042 |
| 5,992,864 | A |  | 11/1999 | Dickson et al. |
| 6,279,930 | B1 | * | 8/2001 | Chang et al. ............. 280/87.042 |
| 6,286,843 | B1 |  | 9/2001 | Lin |
| 6,299,186 | B1 | * | 10/2001 | Kao et al. ................. 280/87.041 |
| 6,382,646 | B1 |  | 5/2002 | Shaw |

(Continued)

FOREIGN PATENT DOCUMENTS

FR    2467003    4/1981

*Primary Examiner* — Kevin Hurley
*Assistant Examiner* — Michael Stabley
(74) *Attorney, Agent, or Firm* — Cowan, Liebowitz & Latman, P.C.

(57) ABSTRACT

A vehicle for infants includes a footboard, a chassis with front and rear chassis supports, two front wheels, at least one rear wheel, a bar extending vertically from the front chassis support, a handle extending from the bar to be gripped by the vehicle's user, and optionally a removable seat. The vehicle is steered by the user's particular application of weight applied to the footboard in which the application of more weight to one side of the footboard (or the shifting of weight) causes the front wheels of the vehicle to steer the vehicle in the direction of that side.

12 Claims, 8 Drawing Sheets

(56) References Cited

U.S. PATENT DOCUMENTS

| | | |
|---|---|---|
| 6,494,470 B2 * | 12/2002 | Chang ................. 280/87.041 |
| 6,511,083 B1 | 1/2003 | Tsai |
| 6,910,743 B2 * | 6/2005 | Cheng ........................ 301/133 |
| 7,055,841 B2 | 6/2006 | Buhrman |
| 7,222,871 B2 | 5/2007 | Michelau et al. |
| 7,226,062 B1 | 6/2007 | Stefano |
| 7,416,197 B2 | 8/2008 | Mackin et al. |
| 7,540,517 B2 | 6/2009 | Wernli |
| 8,262,114 B2 | 9/2012 | Jessie, Jr. |
| 2001/0008332 A1 | 7/2001 | Bisson |
| 2002/0017768 A1 | 2/2002 | Nardone |
| 2002/0096846 A1 | 7/2002 | Chen |

* cited by examiner

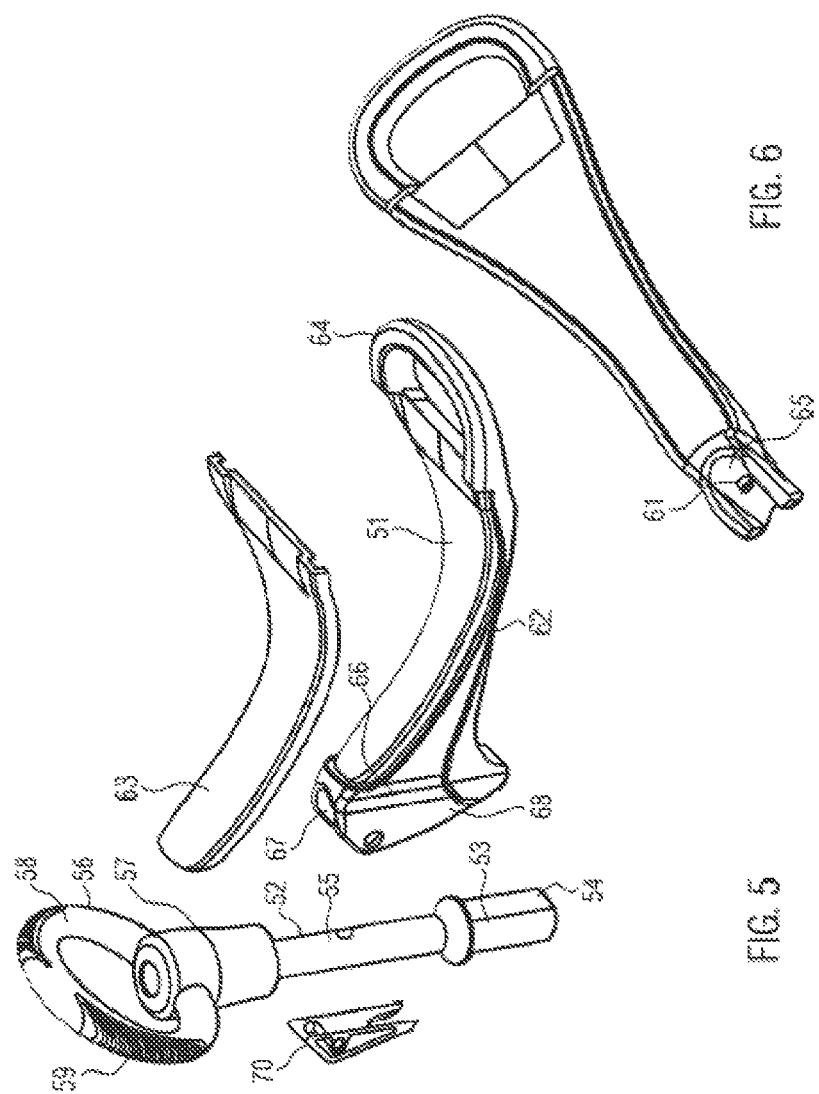

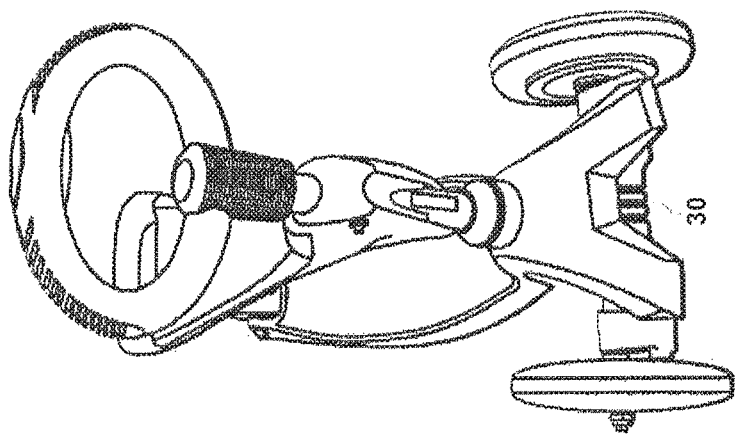

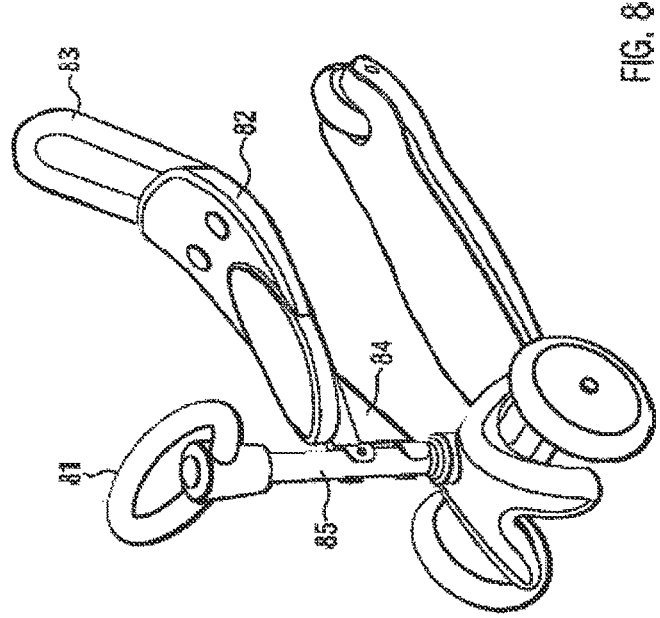

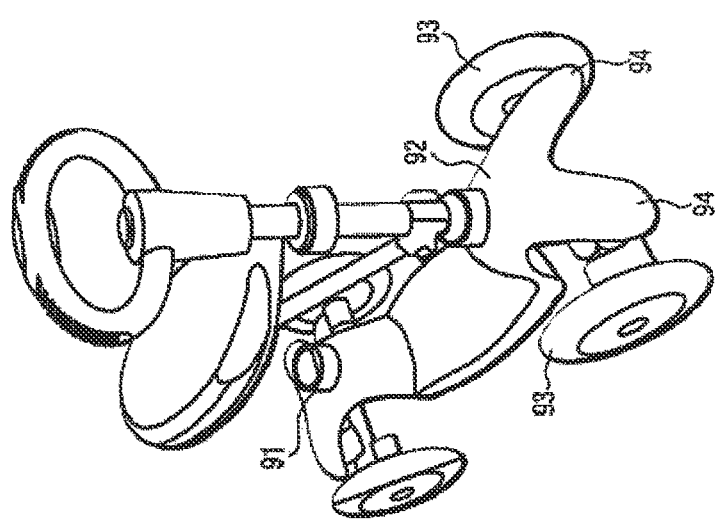

INFANT SCOOTER

REFERENCE TO RELATED APPLICATIONS

This is a continuation of U.S. patent application Ser. No. 14/291,847, filed May 30, 2014; which is a continuation of U.S. patent application Ser. No. 13/346,591, filed Jan. 9, 2012, which issued on Jun. 3, 2014 as U.S. Pat. No. 8,740, 236; and which claims priority to German Application No. DE 20 2011 001 596.3, filed Jan. 17, 2011, which applications are hereby incorporated by reference.

BACKGROUND OF THE INVENTION

1. Field of the Invention

The present invention relates to an infant scooter.

2. The Relevant Technology

Scooters have experienced a renaissance in early 2000 which is due to the modernization of the traditional scooter concept using new materials and in particular offering improved driving qualities. Here, in particular, the following three types have gained acceptance.

On the one hand, the two-wheel folding scooter, preferably made of aluminum; on the other hand, the kickboard normally designed with three wheels (registered European trade mark of Micro Mobility Systems AG), with the features of a flexible, concave footboard made of wood; and finally a kind of combination of the two basic models, namely the two-wheel scooter, also with a so-called flexdeck, i.e. a flexible concave footboard made of wood. Two-wheel scooters normally have height adjustable handle bars with grips similar to a short bicycle handle bar. In contrast, kickboards normally only have a steering bar with a spherical termination of plastic.

The kickboard is generically referred to as 3-wheeler and has found many imitators. The advantage of the kickboard is that the drivability is more dynamic than with the rigid two-wheel scooter; the driving behavior is thus closer to that of a skateboard. Due to the existing handle bar, however, it is much easier to drive than a skateboard and, due to the normally provided two front wheels and one rear wheel, it is on the other hand easier to drive than a two-wheel scooter, in particular for infants.

Since the kickboard, in difference to skateboards, is nevertheless a vehicle that can and should be used on public roads, its construction is stable in this respect, in contrast to the skateboards designed for extreme sports or for playing.

Due to this very solid design and the minimum size required for a sturdy driving behavior, kickboards are rather suited for adolescents and adults than for children or infants.

To overcome this problem, in 2006, the present applicant developed a kickboard for children which is, as to its design and driving behavior, very close to the kickboard, but which is nearly completely made of plastic. Due to this fact, the corresponding vehicle is very light and thus also suited for infants. Moreover, fabrication is inexpensive, and correspondingly cheap prices can be obtained. Finally, with this design, any sharp edges or hard materials can be avoided so that the risk of injury is minimized. Moreover, the handle bar is shortened, corresponding to the infants' requirements.

This child's kickboard has meanwhile become a trendsetter and is accordingly popular with children as well as with responsible adults.

While some two-year-olds can already easily drive the child's kickboard, and these child's kickboards increasingly replace corresponding walking or balance bikes, one can generally say that for two year old and younger children, driving a child's kickboard involves certain risks due to possible falls. Two-year-old and younger children therefore still use, as before, conventional tricycles to sit on, tractors, and the like. The Bobby Car is particularly popular (registered trademark of the Company BIG). This design is also characterized by a low weight, stable construction, blunt edges and good drivability

SUMMARY OF THE INVENTION

It is the object of the present invention to suggest a kickboard or scooter version which is well-suited also for infants under the age of three.

This object is achieved by the claimed subject matter.

Preferred embodiments are the subject matter of the subclaims.

BRIEF DESCRIPTION OF THE DRAWINGS

In the following, preferred basic embodiments of the present invention are illustrated more in detail with reference to the enclosed drawings. The drawings show in detail:

FIG. 5 and FIG. 6 a detailed view of certain components according to a preferred embodiment of the vehicle according to the invention;

FIG. 7 a front view of a further preferred embodiment of the vehicle according to the invention;

FIG. 8 another preferred embodiment of the vehicle according to the invention; and FIG. 9 another preferred embodiment of the vehicle according to the invention.

DETAILED DESCRIPTION OF PREFERRED EMBODIMENTS

Figure 1:
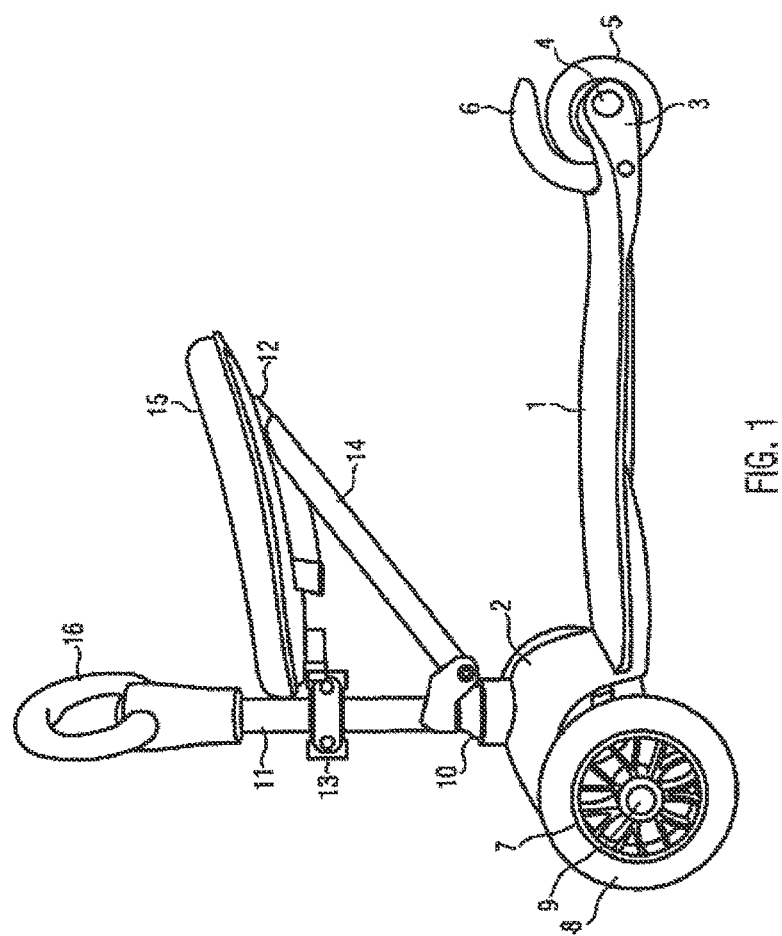
FIG. 1 a preferred embodiment of the vehicle according to the invention.

FIG. 1 shows a preferred embodiment of the vehicle according to the invention for infants. To put it simple, the novel vehicle in its basic concept consists of a kickboard for infants which is in addition equipped with a saddle or a seat and a particular steering means. The vehicle thus consists of a footboard 1 which is approximated to a conventional kickboard and has a concave shape. This footboard is made of plastic, unlike the kickboard. A front chassis support 2 and a rear chassis support 3 are formed integrated with the step surface 1. The rear chassis support 3 comprises an axle 4 about which the relatively small rear wheel 5 rotates. By usual means, as with kickboards, a brake device 6 to be operated by the foot is formed at the rear wheel in addition, which brake device can be pressed downwards by the user's foot against spring action to thereby produce friction on the wheel 5 and thus develop a braking effect. Like the footboard, this brake is made of plastic.

The front chassis support supports a steering mechanism 7 as well as two large front wheels 8 which are mounted to rotate about an axle 9.

The front chassis support is designed like a dome and bifurcated towards the front. The shape of this chassis support is shown again in detail in FIG. 2. Reference will be made to this representation below.

The front chassis support centrically comprises a base 10 in which a steering bar 11 is inserted, screwed or glued. A seat means 12 is fixed to the steering bar in the upper region of the steering bar with a threaded joint 13. This seat means is in addition supported by a crossbar 14 for improved stability, the crossbar supporting itself on the one hand at the rear lower portion of the seat means and on the other hand in the lower region of the steering bar 11. Correspondingly, in the state ready to start, the crossbar preferably extends starting from the lower rear seat area diagonally downwards towards the steering bar.

The basic construction of the seat means or the saddle, respectively, including the crossbar, can be made of plastic or aluminum. The mounting of the seat means at the upper region of the steering bar is preferably effected by screw clamps, other solutions known to the person skilled in the art which permit a firm connection of the seat means to the steering bar being also conceivable here. In the upper region, the seat means comprises a padded region 15, this region preferably consisting of a foam or plastic layer which is firmly connected to the supporting elements located under it.

A handle 16 is fitted or screwed or glued onto the steering bar and preferably has an annular design. Particularly preferred, the annular handle has an elliptic shape. This type of grip proved to be particularly suited for infants in tests. It is thus neither a handle bar which involves certain risks of injury, nor a spherical terminal element, like with the kickboard, which is too difficult to grip for infants and would result in a more difficult steering behavior. The annular holding element can be gripped by infants with both their hands and involves very little risks of injury due to its round embodiment. The radius of the circular element is dimensioned such that on the one hand, infants can comfortably grip it, and on the other hand, sufficient lever action is developed to be able to drive curves.

Figure 2:
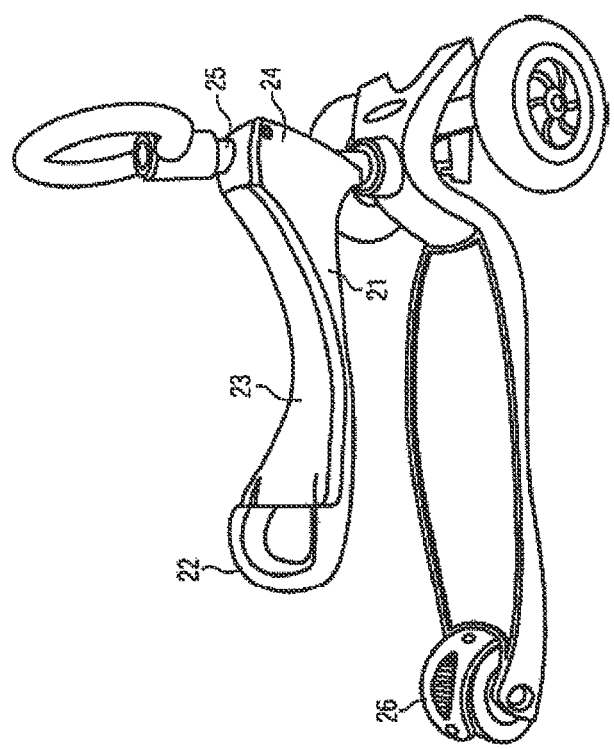
FIG. 2 another preferred embodiment of the vehicle according to the invention.

FIG. 2 shows another preferred embodiment of the new vehicle according to the invention. In variation to FIG. 1, this embodiment has another type of seat means. In this variant, the seat means 21 has the shape of a banana and passes over to a handle element 22 in the rear portion. The complete seat means designed like a banana is covered with a padding element 23. The design is approximated to that of a motocross bike. This design permits particularly comfortable sitting. The narrow design ensures that infants can comfortably sit and, due to the roundings and the long padded region, a particularly low potential of risks. The handle in the rear region, together with the steering wheel, permits a particularly easy transport of the vehicle, where even infants can transport it due to the low overall weight of this variant. The banana-shaped seat means passes over to an integrally formed fixing means 24 in the front portion towards the steering bar, the fixing means being dispersed by the steering bar 25 in the mounted state. It is evident for the person skilled in the art that, due to the extension of the seat means in the region of the mounting to the steering bar, a particularly stable connection that can accept high forces can be achieved. Moreover, in this embodiment, the steering bar is practically completely enclosed by the integrally formed seat means, so that due to the soft design of the seat means, there are no sharp edges at all at which an infant could get hurt. The shown variant for the seat means can also be combined with the variant according to FIG. 1. It is evident for the person skilled in the art that the individual components can be arbitrarily interchanged. In the variant shown in FIG. 2, the brake means is also remarkable. In this brake means 26, particular care was taken that infants can particularly easily step on it. Correspondingly, the design is wide and flat and bends closely around the rear wheel, the rear wheel also being protectively covered by it.

The present invention generally permits a modular concept. The footboard with the chassis supports and wheels can be generally made such that the steering bar can be removed together with the seat means. It can be released by threaded joints or plug-in connections. Correspondingly, the steering bar with the gripping means and the seat means can be removed and replaced by a steering bar with a spherical termination, similar to kickboards for adults. In this manner, the vehicle for infants is converted into a vehicle for bigger children and so to speak "grows" together with the child. According to the present invention, however, it is also provided that only the seat means is removable, so that a vehicle of the type of a kickboard for infants with a gripping means is formed which clearly differs from the conventional kickboards and is better suited for infants. Finally, after the seat has been removed, a steering bar can be employed as a steering bar which is similar to that of scooters, i.e. a steering bar similar to bicycle handle bars. This variant can thus be considered as next stage and can be driven even more easily than the variant where a steering bar with a spherical thickening is inserted.

Figure 3:
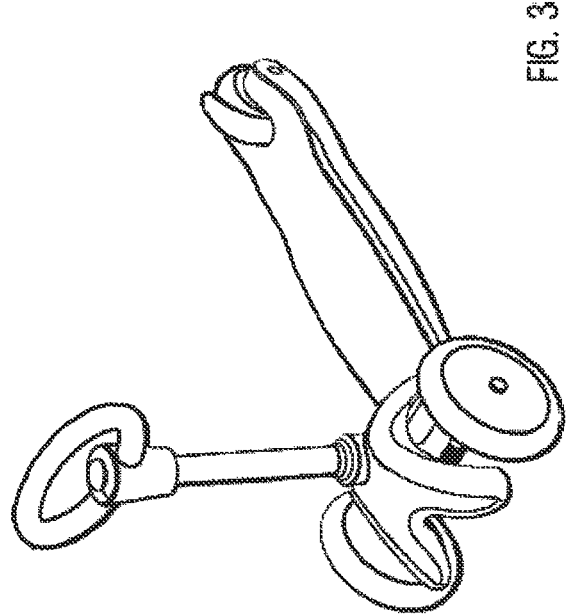
FIG. 3 a preferred embodiment for explaining the modular conception of the vehicle according to the invention according to a preferred variant.

FIG. 3 shows the child's kickboard with a short steering bar with a handle, similar to FIG. 1, but with the seat means being removed.

Figure 4:
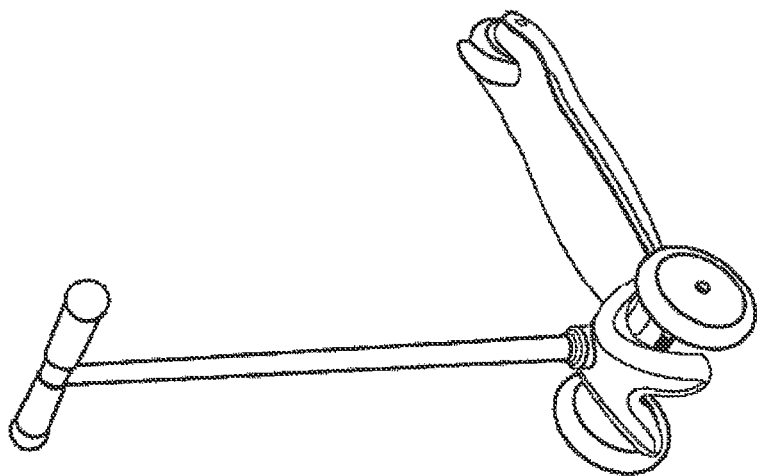
FIG. 4 another preferred embodiment for explaining the modular conception of the vehicle according to the invention according to a preferred variant.

FIG. 4 shows the child's kickboard of FIG. 3 with an exchanged steering bar. This steering bar corresponds to a steering bar as it is common in scooters, but with a transverse handle bar similar to a bicycle.

FIG. 5 shows again details of a preferred embodiment of the inventive vehicle for children. The shown embodiment corresponds to the variant according to FIG. 2, but it shows various details more precisely. One can see the seat means 51 and the steering means 52. The steering means consists of a basic element 53 which essentially has a round design but comprises bevels 54 at least two sides which, when the basic element is inserted, can be inserted into a corresponding opening in the front chassis support of the child's kickboard. Here, the basis 53 can comprise means for automatic locking or anchoring, so that after the basis 53 has been inserted into the corresponding opening at the front chassis support of the child's kickboard, automatic locking is effected. The steering bar 52 moreover comprises a central part 55 as well as an upper part onto which the handle bar is fitted, glued or screwed. The steering means 56 essentially comprises a central element 57 by means of which the handle bar is placed over the steering bar. Integrated in this central element is a preferably elliptic handle 58, the annular handle comprising a holding profile 59 on its upper side by means of which the ring can be safely gripped by a child's hands. The total height of the steering bar including the handle is dimensioned such that a child of 2 to 3 years can comfortably hold the grip in a seated position. At least the grip is made of plastic or rubber, so that even in case of falls, the risk of injury is minimized. The elliptic shape permits to effect sufficient leverages for steering. In the central part 55 of the steering bar, there is a bore 60 which corresponds with a groove 61 of the seat means and receives the latter. The seat means essentially consists of a basic seat means 62 which is preferably shaped from plastic. The seat obtained thereby comprises a rounded or banana-shaped design, so that an infant can sit particularly comfortably and safely. The upper side is provided with a padding 63 having a corresponding shape and being flush. The padding can be inserted, screwed or glued. The padding itself is preferably made of rubber or foam. One can see that the seat widens towards the rear, so that it is wider towards the end than in the front region. The basic seat has a gripping element 64 towards its end, the gripping element passing over into the seat means and being flush with it, so that no edges occur and the padding can extend evenly to the beginning of the grip and there pass over into the grip. The seat means altogether reminds of seat shapes known from motocross sport.

FIG. 6 shows the basic seat from its rear; the remarkable thing being the groove 61 in the region of the front bevel 65 which can engage the mentioned bore 60 of the central region of the steering bar and there prevent a swiveling of the seat.

The profile of the basic seat means 62 in the front region is particularly mentionable. As is shown, the basic seat means 62 is relatively thin in the rear region, but it is getting increasingly thick towards the front due to its curved shape, so that in the front region, an element is formed which extends over at least 10 cm, preferably 20 cm, along the steering bar. Here, the front element 66 has a round recess 67 in which the central part of the steering bar extends in its mounted state. As is furthermore shown, the profile in the front area is approximately triangular, so that when the basic seat means is placed onto the steering bar, a kind of skirt extends to the other side of the steering bar. The corresponding two skirt elements 68 comprise a bore 69 through which, in the mounted state, a bolt can be inserted by which the two skirts each press against the steering bar enclosed by the skirts and thus reliably hold the seat means at the steering bar. Due to the relatively long vertical extension of the front part of the basic seat means, forces are well absorbed, so that a particularly stable seat and a particularly safe vehicle are formed. Preferably, a plastic clamp 70 is also added from the front by which the enclosed steering bar is also covered from the front, the plastic clamp 70 also being held by the mentioned bolt and the plastic clamp having corresponding bores to this end. The plastic clamp 70 in connection with the skirts of the basic seat means thus form a complete case which, in the mounted state, comprises the central part of the steering bar, so that a particularly compact and optically appealing appearance results.

FIG. 7 shows again details of the structure thus obtained. One can see that the steering bar is completely covered by the skirts and the intermediate element inserted in-between, where the skirts as well as the intermediate covering element are held by the indicated bolt.

FIG. 7 shows again the elliptically held handle bar and the basic element on the front chassis support into which the steering bar is inserted with its basic element. Moreover, FIG. 7 shows how the front chassis support is bifurcated, where a fork element similar to an A is formed. Other embodiments can also be designed with roundings.

FIG. 8 shows another embodiment of the vehicle according to the invention. One can see again the preferably elliptic handle bar 81, a seat means 82, wherein the seat means 82 in this embodiment comprises a back rest 83 in a U shape and the seat means itself is bent. For the mounting at the handle bar, in this means, a kind of integrated crossbar 84 is provided, wherein the crossbar is not designed as a tube but as a triangular element which abuts with one side at the steering bar 85 and with another side supports the seat means 82.

FIG. 9 finally shows another embodiment of the vehicle according to the invention, this embodiment being similar to the embodiment according to FIG. 1 and correspondingly comprising a visible crossbar for supporting the seat means. As one can see, in this embodiment, not 3 but 4 wheels are provided, i.e. the rear chassis support also supports 2 wheels. In particular, the rear chassis support can also comprise a basic element 91 for fixing a steering bar, whereby theoretically two steering bars can be mounted on the child's kickboard. Altogether, the footboard is designed to be nearly symmetric, so that in principle, there is no difference between the front and the rear chassis supports. By this symmetry, this child's kickboard can be particularly inexpensively fabricated. Moreover, the further basic element in the rear chassis support permits to insert further parts, such as, for example, the anchor of a trailer which is pulled by the child's kickboard. Preferably, two-wheel transport trailers are provided as accessories which are equipped with an arm that can be inserted into the basic element of the rear chassis support with an anchoring means, so that the trailer can be pulled.

It is evident for the person skilled in the art that all variations according to FIGS. 1 to 9 can be combined with each other such that, for example, the 4 wheels according to FIG. 9 can also be present in any other variant. Equally, for example the different shown seat means according to FIGS. 1 to 9 can be interchanged, such that e.g. the seat means according to FIG. 9 can also be employed in models according to FIG. 1 or 2, or in further alternatives.

Preferably, in all variants, and in particular in the variant shown in FIG. 9, the front chassis support 92 is made of plastic or rubber and projects with its two tips beyond the termination of the front wheels 93, such that a kind of bumper 94 is formed which reduces the impact of the vehicle on obstacles, such as walls or furniture. This results in a reduction of the risk of injuries for the child and in a protection of objects against which the child drives.

The bumper is, as is shown, designed in a bifurcated manner, being quasi integrated in the front chassis support which is preferably dome-shaped. By the preferred integration, the bifurcated embodiment adopts the dome-shaped extension, such that the two fork elements converge from the top to the bottom in a bent manner.

The vehicle according to the invention is, as described above, preferably designed as a child's kickboard from its basic construction, however, it is essentially designed with a different steering means, in particular the oval handle and a seat means which is preferably fixed to the steering bar. In particular, the present invention is also based on the idea of steering the vehicle by shifting of weight and thus driving curves, and not via a steering wheel, as it is the case, for example, in the mentioned Bobby Car. As is shown with reference to the various figures, steering via shifting of weight is in particular achieved in that the two front wheels comprise a double-pivot steering, wherein the two front wheels in particular comprise an inclination, whereby, seen from the front, the distance between the front wheels tapers towards the top. Moreover, the two front wheels can be easily run out of the parallel track, preferably, the tracks of the two front wheels extend away from each other, such that the distance of the front wheels is greater in the foremost region than in the rear region.

Due to this configuration and in particular in combination with the provided double-pivot steering, the vehicle will tilt into the driven curve when the weight is shifted, i.e. the footboard is tilted during cornering. This is because, due to the mentioned inclination, the inner wheel is tilted still further, the tilt at the outer wheel, however, is reduced, and thus the axle of the internal wheel has a smaller distance to the ground than the external wheel during cornering. This is all accomplished by shifting of weight, wherein the double-pivot steering on the bottom side works against a spring 30 which, after the force of weight transfer is reduced again, takes care that the wheels align uniformly again. Preferably, the double-pivot steering centrically has a U-shaped clip which is fixed to the bottom side of the footboard and which is, during shifting of weight, laterally shifted at the same level with respect to its ends.

With the vehicle according to the invention, one can thus drive considerably narrower radii than with typical Bobby Cars. Moreover, the curve properties are furthermore improved if such a double-pivot steering is not provided only at the front, but also at the rear of the vehicle, i.e. with altogether four wheels and a double-pivot steering at the front and rear, as is shown in FIG. 9. The above embodiments of the suspension of the wheels would then correspondingly also apply to the rear wheels. The narrow cornering thus obtained is particularly important if children want to drive slalom around tables and chairs in small apartments. Moreover, this type of steering is of particular importance for the development of the motor action of infants. It is just at the age of 1 to 3 that the disposition of this initial motor action is decisive for the later development and the children's skills in their further development. It is conceivable to also design the vehicle according to the invention differently, i.e. without a typical footboard like that of a kickboard. Under this further aspect of the present invention, it is only decisive that it is a vehicle for children which can be steered by shifting of weight, preferably by providing a double-pivot steering, and particularly preferred by the double-pivot steering being present at the front as well as at the rear of the vehicle, with altogether four wheels. This further aspect is independent of the above shown figures and represents itself an innovation over former child's vehicles. Insofar, it is generally a matter of a vehicle with three or four wheels, a seat means, a handle without handle bar, and as an alternative to the handle bar, a steering mechanism which can be exclusively steered by shifting of weight.

Despite the different variants shown in connection with FIGS. 1 to 9 for the seat means, it is particularly preferred to fabricate the seat means completely without any metal parts and preferably of one plastic piece onto which optionally a softer seat cover is applied. Insofar, a construction corresponding to FIG. 2 for the seat means is the preferred variant, where it is here characteristic that the seat means consists of a fabricated plastic seat which can receive the steering bar in a milled-out portion and which can be clamped by means of one bolt or several bolts to the steering bar. As described in connection with FIG. 2, such a construction has an appearance similar to that of a motocross design, and in particular thus two skirts enclose the handle bar at the left and right, and these skirts can be shifted towards each other in front of the steering bar via a threaded joint, so that they pinch the steering bar.

Seen from the front, a distance typically remains between the skirts, so that one can see the steering bar at the same level from the front. For an even more integral impression, it is preferably provided to mount a kind of cover or intermediate piece from the front which is quasi seamlessly incorporated in the design, so that an altogether closed impression is given and the steering bar is thus completely enclosed by this overall construction in the central part.

As mentioned above, the vehicle according to the invention can have a modular design, so that an alteration can be achieved corresponding to the development phase of the child. In the first phase, the vehicle is configured similar to FIG. 2 with a height adjustable saddle. In the second stage, the saddle can be removed, while the handle at the steering bar remains, this handle preferably also being height adjustable. Finally, the alteration with a T-steering bar is possible, similarly to that shown in FIGS. 3 and 4.

What is claimed is:

1. A vehicle for children comprising:
   a footboard including a chassis with:
   a front chassis support, the front chassis support including at least two front wheels mounted thereon and a spring that biases the two front wheels into alignment when weight is not applied to the footboard; and
   a rear chassis support including at least one wheel mounted thereon;
   a bar coupled to and extending vertically from the front chassis support;
   a handle extending from the bar and adapted to be gripped by a user of the vehicle;
   a seat and a crossbar, the seat including a first fixing location and a second fixing location, the seat being fixed to the bar at the first fixing location and fixed to, and supported by, the crossbar at the second fixing location, the crossbar including a first terminus disposed under the seat and a second terminus disposed beneath the seat and at a position lower than a position of the first terminus,
   wherein, when a first weight applied to a first side of the footboard is greater than a second weight applied to a second side of the footboard, the front wheels of the vehicle steer, in response to the applied first weight and second weight, in a direction of the first side of the footboard, and when the first weight applied to the first side of the footboard is less than the second weight applied to the second side of the footboard, the front wheels of the vehicle steer, in response to the applied first weight and second weight, in a direction of the second side of the footboard.

2. The vehicle of claim 1, wherein the bar is fixed to the front chassis support so that the bar cannot turn about its axis relative to the front chassis.

3. The vehicle of claim 1, further comprising a brake disposed over and around at least a portion of the rear wheel, the brake being substantially semi-circular in shape, made of plastic, and adapted to cause a braking effect of the rear wheel when depressed.

4. The vehicle of claim 1, wherein at least one of said first weight and said second weight is no weight.

5. A vehicle for infants, comprising:
   a footboard including a chassis with:
   a front chassis support, the front chassis support including at least two front wheels mounted thereon and a spring that biases the two front wheels into alignment when weight is not applied to the footboard; and
   a rear chassis support including at least one wheel mounted thereon;
   a bar extending vertically from the front chassis support and fixed thereto so that the bar cannot turn about its axis relative to the front chassis;
   a handle extending from the bar and adapted to be gripped by an operator of the vehicle; and
   a seat releasably coupled to the bar, the seat including a front region, a front bevel located within the front region, and a groove in a region of the front bevel, the groove adapted to engage a bore within the bar for preventing a swiveling of the seat relative to the bar,
   the footboard being configured to receive a weight shift towards either a first side of the vehicle or a second side of the vehicle, the front chassis support being configured so that the weight shift causes the front wheels of the vehicle to steer the vehicle in a direction of the weight shift.

6. The vehicle of claim 5, wherein the handle is a first handle, the seat is releasably coupled to the bar at a front portion of the seat; and a second handle is affixed to a rear portion of the seat.

7. The vehicle of claim 5, wherein the front chassis support and the rear chassis support are integral with the footboard, the front chassis support including a base from which the bar extends.

8. A method of operating a vehicle for a child, comprising the steps of:
providing a vehicle with:
a footboard including a chassis with:
a front chassis support, the front chassis support including at least two front wheels mounted thereon and a spring that biases the two front wheels into alignment when weight is not applied to the footboard; and
a rear chassis support including at least one wheel mounted thereon;
a bar extending vertically from the front chassis support and fixed thereto so that the bar cannot turn about its axis relative to the front chassis;
a handle extending from the bar and adapted to be gripped by an operator of the vehicle;
a seat and a crossbar, the seat including a first fixing location and a second fixing location, the seat being fixed to the bar at the first fixing location and fixed to, and supported by, the crossbar at the second fixing location, the crossbar including a first terminus disposed under the seat and a second terminus disposed beneath the seat and at a position lower than a position of the first terminus;
receiving, by the footboard, a weight shift of the child operating the vehicle towards either a first side of the vehicle or a second side of the vehicle; and
steering, by the front wheels of the vehicle, in a direction of the weight shift in response to the weight shift of the child.

9. The method of claim 8, wherein the vehicle has a seat coupled to the bar, the method further comprising:
sitting, by the child, on the seat;
gripping, by the child, the handle extending from the bar; and
steering, by the child, of the vehicle by means other than turning the bar relative to the front chassis due to the fixed connection between the bar and the front chassis.

10. The method of claim 9, further comprising removing the seat from the vehicle; and operating the vehicle, by the child, by standing, by the child, on the footboard and by steering, by the child, by shifting the weight on the footboard during the steering step.

11. A vehicle for infants, comprising:
a footboard including a chassis with:
a front chassis support, the front chassis support including at least two front wheels mounted thereon and a spring that biases the two front wheels into alignment when weight is not applied to the footboard; and
a rear chassis support including at least one wheel mounted thereon;
a bar extending vertically from the front chassis support and fixed thereto so that the bar cannot turn about its axis relative to the front chassis;
a first handle extending from the bar and adapted to be gripped by an operator of the vehicle; and
a seat fixed to the bar at a front portion of the seat, the seat including a second handle,
the footboard being configured to receive a weight shift towards either a first side of the vehicle or a second side of the vehicle, the front chassis support being configured so that the weight shift causes the front wheels of the vehicle to steer the vehicle in a direction of the weight shift.

12. A method of operating a vehicle for a child, comprising the steps of:
providing a vehicle with:
a footboard including a chassis with:
a front chassis support, the front chassis support including at least two front wheels mounted thereon and a spring that biases the two front wheels into alignment when weight is not applied to the footboard; and
a rear chassis support including at least one wheel mounted thereon;
a bar extending vertically from the front chassis support and fixed thereto so that the bar cannot turn about its axis relative to the front chassis;
a handle extending from the bar and adapted to be gripped by an operator of the vehicle; and
a seat releasably coupled to the bar, the seat including a front region, a front bevel located within the front region, and a groove in a region of the front bevel, the groove adapted to engage a bore within the bar for preventing a swiveling of the seat relative to the bar,
receiving, by the footboard, a weight shift of the child operating the vehicle towards either a first side of the vehicle or a second side of the vehicle; and
steering, by the front wheels of the vehicle, in a direction of the weight shift in response to the weight shift of the child.

* * * * *